United States Patent [19]

Suzuki et al.

[11] 4,088,599
[45] May 9, 1978

[54] TERBIUM-ACTIVATED ALKALINE-EARTH METAL SILICATE PHOSPHORS

[75] Inventors: Teruki Suzuki, Funabashi; Shinkichi Tanimizu, Kokubunji; Yukio Ohno, Ome, all of Japan

[73] Assignee: Hitachi, Ltd., Japan

[21] Appl. No.: 704,084

[22] Filed: Jul. 9, 1976

[30] Foreign Application Priority Data

Jul. 11, 1975   Japan .................................. 50-84474

[51] Int. Cl.$^2$ .............................................. C09K 11/46
[52] U.S. Cl. ........................ 252/301.4 F; 252/301.6 F
[58] Field of Search ................... 252/301.4 F, 301.6 F

[56] References Cited

U.S. PATENT DOCUMENTS

| | | | |
|---|---|---|---|
| 2,821,508 | 1/1958 | Crosby et al. | 252/301.4 F |
| 3,260,675 | 7/1966 | McAllister | 252/301.4 F |
| 3,468,810 | 9/1969 | Mizumo | 252/301.4 F |
| 3,523,091 | 8/1970 | McAllister | 252/301.4 F |
| 3,544,481 | 12/1970 | Barry | 252/301.4 F |

OTHER PUBLICATIONS

Peters, "J. Electrochem. Soc.", Jul., 1969 pp. 985–988.

*Primary Examiner*—Jack Cooper
*Attorney, Agent, or Firm*—Craig & Antonelli

[57] ABSTRACT

A phosphor system consisting of an alkaline-earth metal silicate host lattice activated by trivalent terbium together with monovalent alkaline metal as a charge compensator, said phosphor system corresponding to the formula, $X_{3-x}Y_{1-x}Si_2O_8$: $Tb_x$, $Z_x$ wherein X is at least one of Ba, Sr, and Ca; Y is at least one of Mg and Zn; and Z acting as a charge compensator is at least one of Li, K, and Na, and x is from 0.001 to 0.95, said phosphor system substituting Ca plus Mg for X plus Y of the formula being excluded. The present invention provides an efficient green-emitting phosphor particularly useful for a deluxe fluorescent lamp.

11 Claims, 3 Drawing Figures

TERBIUM-ACTIVATED ALKALINE-EARTH METAL SILICATE PHOSPHORS

BACKGROUND OF THE INVENTION

This invention relates to a phosphor having a special effect when applied to a deluxe fluorescent lamp and a phosphor screen of cathode ray tube, and more particularly to an alkaline-earth metal silicate phosphor activated by trivalent terbium ($Tb^{3+}$).

In the latest deluxe fluorescent lamps, a mixture of several kinds of phosphors in an appropriate proportion is used to obtain a proper spectral power distribution in a visible region and also obtain a high color rendering index. As a green-emitting phosphor for such lamps, zinc silicate activated by divalent manganese has been usually used so far. The emission peak wavelength ($\lambda p$) of the zinc silicate phosphor is approximately equal to 525 nm. For example, when said zinc silicate phosphor is used as a green-component phosphor for the deluxe cool white lamp based on a blend of three phosphors, i.e. blue, red and green-emitting phosphors, the emission peak wavelength ($\lambda p$) is disadvantageously small. For a cool white lamp with color temperatures of 4100K and CIE chromaticity coordinate of $x = 0.380$ and $y = 0.390$, calculations show that a green-component phosphor peaking at 535 ± 8 nm ($\lambda p$) is required for general color rendering indices $R_a$ greater than or equal to 85.

SUMMARY OF THE INVENTION

An object of the present invention is to provide a phosphor for green-component applicable to a deluxe fluorescent lamp.

Another object of the present invention is to provide a phosphor having a main emission peak wavelength ($\lambda p$) or 535 ± 8 nm.

These objects can be attained by a phosphor system consisting of an alkaline-earth metal silicate host lattice activated by trivalent terbium together with monovalent alkaline metal as a charge compensator, said phosphor system corresponding to the formula:

$$X_{3-x}Y_{1-x}Si_2O_8: Tb_x, Z_x$$

wherein X is at least one of Ba, Sr, and Ca; Y is at least one of Mg and Zn; and Z acting as a charge compensator is at least one of Li, K, and Na, and x is from 0.001 to 0.95, said phosphor system substituting Ca plus Mg for X plus Y of the formula being excluded.

DETAILED DESCRIPTION OF PREFERRED EMBODIMENTS

The present invention provides an efficient green-emitting phosphor particularly useful for a deluxe fluorescent lamp with good color rendering properties and high luminous efficiency. In this case, a high quantum efficiency and also a high luminous efficiency can be obtained when the excitation-peak position is located near 253.7 nm radiation. In the foregoing formula, a phosphor having an amount of Ca equal to or less than 10% by mole is preferable, because the excitation-peak position is located near 253.7 nm. The phosphor having an amount of Ca equal to 10% by mole is the one represented, for example, by the following formula:

$$(Ba_{0.9}Ca_{0.1})_{3-x}Y_{1-x}Si_2O_8:Tb_x, Z_x$$

wherein Y, Z and x have the same meanings as defined above.

However, in the case of a phosphor having an amount of Ca over 10% by mole, the excitation-peak position shifts towards shorter wavelength side, and the excitation intensity of 253.7 nm decreases.

The amount of $Si_2O_8$ in the formula, $X_{3-x}Y_{1-x}Si_2O_8: Tb_x, Z_x$ is not always restricted to the stoichiometric composition. For example, even if the phosphor has, for example, $Si_{2.3}O_{9.2}$, it can be regarded as a compound equivalent by X-ray analysis to the stoichiometric composition, and shows identical emission characteristics.

Similarly, the amount of Z in the formula is not always fixed. For example, a phosphor where the amount of Z is 30% of the amount of Tb, that is, the phosphor represented by the formula, $X_{3-x}Y_{1-x}Si_2O_8: Tb_x, Z_{0.3x}$, can be regarded as equivalent by X-ray analysis to the phosphor having $Z_x$, and shows identical emission characteristics.

Therefore, phosphors represented by the following formula:

$$X_{3-x}Y_{1-x}Si_2O_8: Tb_xZ_{x'}$$

wherein X, Y, Z and x have the same meanings as defined above, and $x'$ is in a range of $x$ to $0.3x$, are also included in the scope of the present invention.

The value of $x$ is in a range of 0.001 to 0.95, as described above, but a preferable range is 0.005 to 0.15.

As the element represented by Z, lithium is preferable, because it fails to form an amalgam with Hg.

Now, the present invention will be described in detail, referring to the following Examples.

EXAMPLE 1

The following raw materials were blended or mixed sufficiently in a ball mill:

| | |
|---|---|
| Strontium carbonate ($SrCO_3$) | 66.7 g |
| Magnesium carbonate ($MgCO_3$) | 12.3 g |
| Silicon dioxide ($SiO_2$) | 19.3 g |
| Terbium oxide ($Tb_4O_7$) | 1.4 g |
| Lithium carbonate ($Li_2CO_3$) | 0.3 g |

Figure 1:
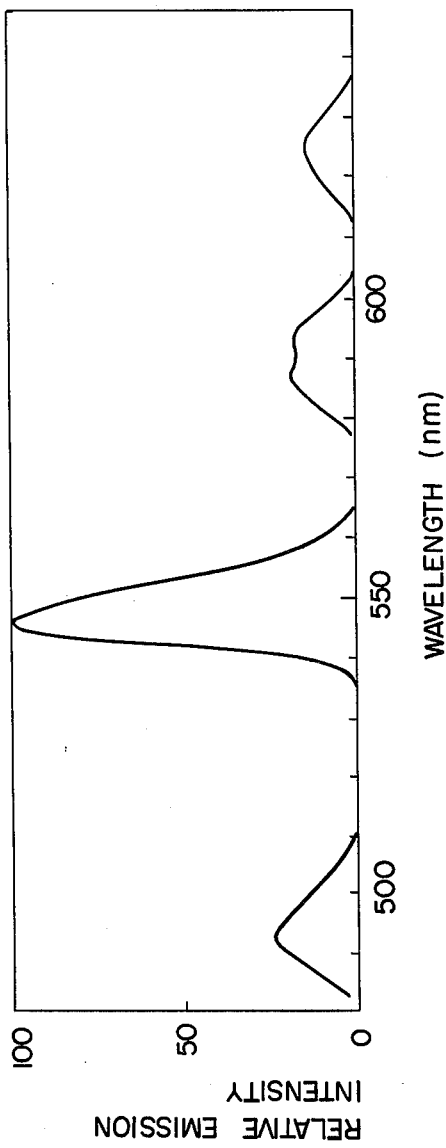
FIG. 1 is a diagram showing emission spectra of a phosphor according to one embodiment of the present invention.

Then, the resulting mixture was filled in a quartz crucible, and fired at 1300° C for 3 hours in an argon gas atmosphere. The resulting phosphor having the following chemical composition formula:

$$Sr_{2.95}Mg_{0.95}Si_2O_8: Tb_{0.05}Li_{0.05}$$

was excited under 253.7 nm radiation, whereby an efficient green emission having emission spectra as shown in FIG. 1 was obtained. The excitation sources for the phosphor were not restricted to the 253.7 nm radiation. When the excitation was made under the 185 nm, 365 nm and other radiations, or under the cathode ray of 8 to 25 kV, the efficient green emission having similar emission spectra was obtained.

EXAMPLE 2

To prepare a silicate phosphor in which all the amount of strontium in Example 1 is substituted with barium, the following raw materials were blended or mixed together sufficiently in a ball mill.

| Barium carbonate (BaCO$_3$) | 72.8 g |
| Magnesium carbonate (MgCO$_3$) | 10.0 g |
| Silicon dioxide (SiO$_2$) | 15.8 g |
| Terbium oxide (Tb$_4$O$_7$) | 1.2 g |
| Lithium carbonate (Li$_2$CO$_3$) | 0.2 g |

The resulting mixture was filled in an alumina crucible, and fired at 1250° C for 3 hours in the air. After the firing, the resulting material was ground in a ball mill, and then refired at 1250° C for 2 hours in an argon atmosphere, whereby a phosphor represented by the following chemical composition formula was obtained

$$Ba_{2.95}Mg_{0.95}Si_2O_8: Tb_{0.05}Li_{0.05}$$

Figure 2:
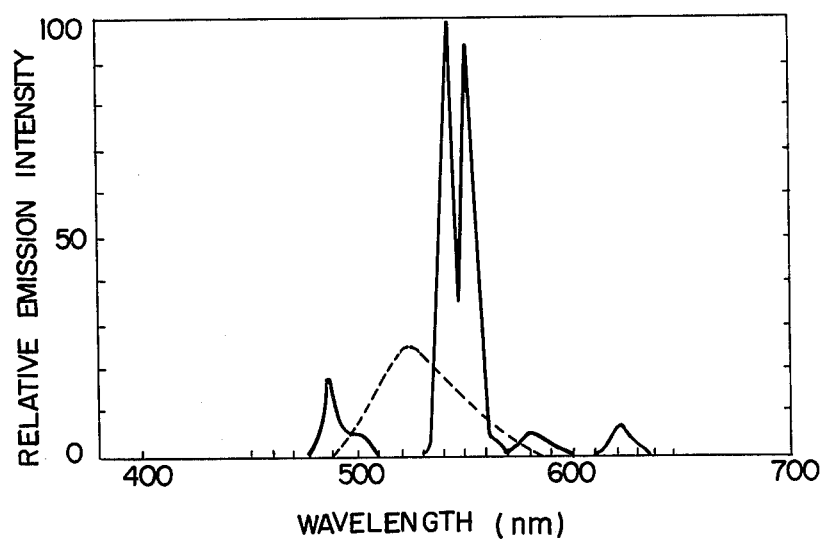
FIG. 2 is a diagram showing relations between a relative emission intensity and a wavelength, where a dotted curve shows emission spectra of prior art zinc silicate activated by divalent manganese and a solid curve shows emission spectra of a phosphor according to one embodiment of the present invention.

The phosphor was excited under 253.7 nm radiation, whereby an efficient green emission having emission spectra as shown by the solid line in FIG. 2 was obtained.

Comparison of the phosphor of the present invention with zinc silicate phosphor activated with manganese, Zn$_2$SiO$_4$: Mn, so far much used as the green-emitting component, reveals that both emission intensity and peak position of the present phosphor are well suited for a green-component of a blend of three phosphors as shown in FIG. 2, where the emission spectrum of Zn$_2$SiO$_4$: Mn is shown by the dotted line. It is noted, for instance, that the present phosphor was by about 30% brighter than the Zn$_2$SiO$_4$: Mn phosphor, when the brightness of these two phosphors was compared with each other.

EXAMPLE 3

The following raw materials were blended or mixed together sufficiently in a ball mill:

| Barium carbonate (BaCO$_3$) | 69.8 g |
| Magnesium carbonate (MgCO$_3$) | 7.5 g |
| Silicon dioxide (SiO$_2$) | 15.9 g |
| Terbium oxide (Tb$_4$O$_7$) | 4.7 g |
| Lithium carbonate (Li$_2$CO$_3$) | 6.7 g |
| Zinc fluoride (ZnF$_2$) | 10.3 g |

The resulting mixture was filled in an aluminum crucible, and fired at 1200° C for 3 hours in an argon gas atmosphere. The resulting phosphor had the following chemical composition:

$$Ba_{2.8}Mg_{0.7}Zn_{0.1}Si_2O_8: Tb_{0.2}Li_{0.2}$$

and were excited under the 253.7 nm, 185 nm, 365 nm and other radiations, and also under the cathode ray of 8 to 25 kV, and had similar emission characteristics to those shown by the solid line in FIG. 2.

EXAMPLE 4

Phosphors having various values of $x$ in the formula:

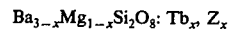
$$Ba_{3-x}Mg_{1-x}Si_2O_8: Tb_x, Z_x$$

were prepared. The following raw materials were blended or mixed together sufficiently in a ball mill, for example, in the case of $x = 0.005$:

| Barium carbonate (BaCO$_3$) | 74.23 g |
| Magnesium carbonate (MgCO$_3$) | 10.54 g |
| Silicon dioxide (SiO$_2$) | 15.09 g |
| Terbium oxide (Tb$_4$O$_7$) | 0.12 g |
| Lithium carbonate (Li$_2$CO$_3$) | 0.02 g | or in the case of $x = 0.60$:

| Barium carbonate (BaCO$_3$) | 61.68 g |
| Magensium carbonate (MgCO$_3$) | 4.39 g |
| Silicon dioxide (SiO$_2$) | 16.43 g |
| Terbium oxide (Tb$_4$O$_7$) | 14.61 g |
| Lithium carbonate (Li$_2$CO$_3$) | 2.89 g |

The resulting mixtures were each filled in individual quartz crucibles, and fired at 1100° to 1300° C in a nitrogen atmosphere containing steam. In view of a flux effect of Li$_2$CO$_3$, a lower firing temperature was selected for higher value of $x$. The resulting phosphors had emission characteristics similar to that of the solid line in FIG. 2, when excited under mercury vapor radiation or said cathode ray. However, CIE chromaticity coordinate shifted from $x = 0.277$, $y = 0.418$ to $x = 0.319$, $y = 0.628$, depending upon Tb concentrations $x$ in the range of from 0.005 to 0.60. It is one of the features of the present phosphors that no concentration quenching was observed in a composition having a considerably large value of $x$, that is, $x = 0.95$. However for $x > 0.96$, a slight concentrating quenching was observed.

EXAMPLE 5

The following raw materials were blended or mixed together sufficiently in a ball mill:

| Barium carbonate (BaCO$_3$) | 68.50 g |
| Calcium carbonate (CaCO$_3$) | 1.83 g |
| Magnesium carbonate (MgCO$_3$) | 9.19 g |
| Silicon dioxide (SiO$_2$) | 16.18 g |
| Terbium oxide (Tb$_4$O$_7$) | 3.59 g |
| Lithium carbonate (Li$_2$CO$_3$) | 0.71 g |

The resulting mixture was filled in a quartz crucible, and fired at 1250° C for 3 hours in a nitrogen atmosphere containing steam, whereby a phosphor represented by the following chemical composition formula was obtained:

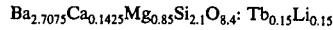
$$Ba_{2.7075}Ca_{0.1425}Mg_{0.85}Si_{2.1}O_{8.4}: Tb_{0.15}Li_{0.15}$$

Even chemical analysis showed that the phosphor was an excess silica composition. The phosphor had emission characteristics similar to that shown by the solid line in FIG. 2, when excited under the 253.7 nm radiation or the cathode ray shown in Examples 1 to 4. Especially good characteristics were obtained when the phosphor was excited under the 253.7 nm radiation.

Figure 3:
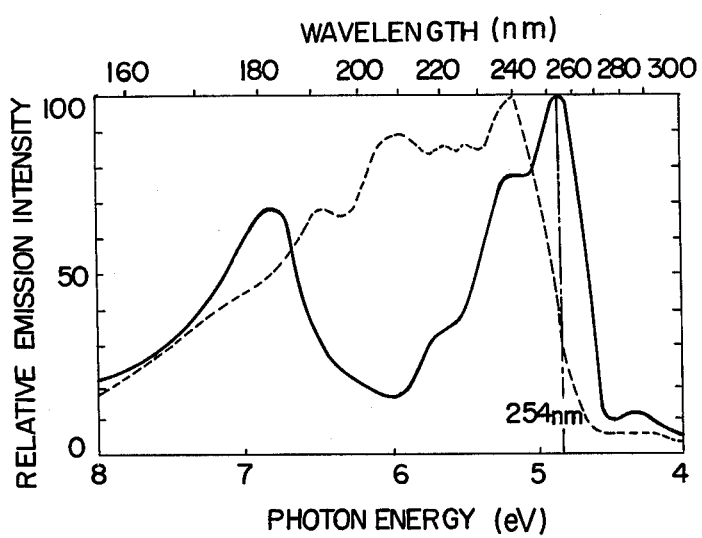
FIG. 3 is a diagram showing relations between relative emission intensity, photon energy and wavelength, where a dotted curve shows fluorescent excitation spectra of a well-known calcium-magnesium silicate activated by trivalent terbium, and a solid curve shows excitation spectra of a phosphor according to one embodiment of the present invention.

That is, in FIG. 3, excitation spectra of $Tb^{3+}$ emission are shown, where the solid line is for the $Ba_{2.7075}Ca_{0.1425}Mg_{0.85}Si_{2.1}O_{8.4}$: $Tb_{0.15}Li_{0.15}$ phosphor, and the dotted line for the $Ca_{2.85}Mg_{0.05}Si_{2.1}O_{8.4}$: $Tb_{0.15}Li_{0.15}$ phosphor. As is evident from FIG. 3, comparison reveals that the excitation peak position of the phosphor of the present invention shown by the solid line was very much identical with the 253.7 nm radiation.

The amount of Ca for matching the excitation peak position to the 253.7 nm radiation must be not more than 10% by mole in said formula, because if the amount of Ca exceeds 10% by mole, the excitation peak position shifts towards the shorter wavelength side, and the excitation intensity at 253.7 nm decreases.

Similar excitation spectra were obtained with a phosphor, a portion of whose Ba was substituted with Sr.

EXAMPLE 6

The following raw materials were blended or mixed together sufficiently in a ball mill:

| | |
|---|---|
| Barium carbonate ($BaCO_3$) | 69.1 g |
| Magnesium carbonate ($MgCO_3$) | 7.4 g |
| Silicon dioxide ($SiO_2$) | 15.8 g |
| Terbium oxide ($Tb_4O_7$) | 4.7 g |
| Potassium carbonate ($K_2CO_3$) | 1.7 g |
| Zinc fluoride ($ZnF_2$) | 1.3 g |

The resulting mixture was filled in an alumina crucible, and fired at 1200° C for 3 hours in an argon or nitrogen gas atmosphere. The resulting phosphor had the following chemical composition formula:

$$Ba_{2.8}Mg_{0.7}Zn_{0.1}Si_2O_8: Tb_{0.2}K_{0.2}$$

and had emission characteristics similar to those shown by the solid line in FIG. 2 when excited under the ordinary cathode ray or mercury vapor radiation.

EXAMPLE 7

The following raw materials were blended or mixed together sufficiently in a ball mill:

| | |
|---|---|
| Barium carbonate ($BaCO_3$) | 69.4 g |
| Magnesium carbonate ($MgCO_3$) | 7.4 g |
| Silicon dioxide ($SiO_2$) | 15.9 g |
| Terbium oxide ($Tb_4O_7$) | 4.7 g |
| Sodium carbonate ($Na_2CO_3$) | 1.3 g |
| Zinc fluoride ($ZnF_2$) | 1.3 g |

The resulting mixture was filled in an alumina crucible, and fired at 1200° C for 3 hours in an argon or nitrogen gas atmosphere. The resulting phosphor had the following chemical composition formula:

$$Ba_{2.8}Mg_{0.7}Zn_{0.1}Si_2O_8: Tb_{0.2}Na_{0.2}$$

and had emission characteristics similar to those shown by the dotted line in FIG. 2, when excited under the ordinary cathode ray or mercury vapor radiation.

When preparing the present phosphors, it is preferable to use colloidal silicon dioxide as a raw material and also preferable to make the firing in a wet atmosphere, atmosphere containing steam, in order to achieve a highly reactive condition, as shown in Examples 4 and 5.

What is claimed is:

1. A phosphor composition which comprises an alkaline-earth metal silicate host lattice activated by trivalent terbium together with monovalent alkaline metal as a charge compensator, said phosphor composition corresponding to the formula, $X_{3-x}Y_{1-x}Si_2O_8$: $Tb_x$, $Z_x$ wherein X is at least one of Ba, Sr, and Ca; Y is at least one of Mg and Zn; and Z acting as a charge compensator is at least one of Li, K, and Na, and x is from 0.001 to 0.95, calcium of the elements represented by X being in an amount of not more than 10% by mole.

2. A phosphor composition according to claim 1, wherein x in the formula is 0.005 to 0.15.

3. A phosphor composition according to claim 1, wherein the element represented by Z in the formula is lithium.

4. A phosphor composition which comprises an alkaline-earth metal silicate host lattice activated by trivalent terbium together with monovalent alkaline metal as a charge compensator, said phosphor composition corresponding to the chemical composition formula:

$$Ba_{2.7075}Ca_{0.1425}Mg_{0.85}Si_{2.1}O_{8.4}: Tb_{0.15}, Li_{0.15}.$$

5. A phosphor composition which comprises an alkaline-earth metal silicate host lattice activated by trivalent terbium together with monovalent alkaline metal as a charge compensator, said phosphor composition corresponding to the formula, $X_{3-x}Y_{1-x}Si_2O_8$: $Tb_x$, $Z_{x'}$ wherein X is at least one of Ba, Sr, and Ca; Y is at least one of Mg and Zn; and Z acting as a charge compensator is at least one of Li, K, and Na, and x is from 0.001 to 0.95, and $x'$ is from x to 0.3x, calcium of the elements represented by X being in an amount of not more than 10% by mole.

6. A phosphor composition according to claim 5, wherein x in the formula is 0.005 to 0.15.

7. A phosphor composition according to claim 5, wherein the element represented by Z in the formula is lithium.

8. A phosphor composition which comprises an alkaline-earth metal silicate host lattice activated by trivalent terbium together with monovalent alkaline metal as a charge compensator, said phosphor composition corresponding to the formula, $X_{3-x}Y_{1-x}Si_2O_8$: $Tb_x$, $Z_x$ wherein X is at least one of Ba and Sr; Y is at least one of Mg and Zn; and Z acting as a charge compensator is at least one of Li, K and Na, and x is from 0.001 to 0.95.

9. A phosphor composition according to claim 8, wherein x in the formula is 0.005 to 0.15.

10. A phosphor composition according to claim 8, wherein the element represented by Z in the formula is lithium.

11. A phosphor composition according to claim 8, wherein the element represented by Y in the formula is magnesium.

* * * * *